US011258299B1

(12) United States Patent
Busekrus

(10) Patent No.: US 11,258,299 B1
(45) Date of Patent: Feb. 22, 2022

(54) GENERATING CHARGE FOR SERVICE DISCONNECT OPERATION

(71) Applicant: Landis+Gyr Innovations, Inc., Alpharetta, GA (US)

(72) Inventor: Doug Busekrus, Lafayette, IN (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 0 days.

(21) Appl. No.: 17/088,238

(22) Filed: Nov. 3, 2020

(51) Int. Cl.
| | |
|---|---|
| *H02J 13/00* | (2006.01) |
| *G01D 4/02* | (2006.01) |
| *H02H 3/02* | (2006.01) |
| *H01H 3/02* | (2006.01) |

(52) U.S. Cl.
CPC .......... *H02J 13/00036* (2020.01); *G01D 4/02* (2013.01); *H01H 3/0213* (2013.01); *H02J 2310/12* (2020.01)

(58) Field of Classification Search
CPC .. H02J 13/00036; H02J 2310/12; G01D 4/02; H01H 3/0213
See application file for complete search history.

(56) References Cited

U.S. PATENT DOCUMENTS

2008/0012666 A1* 1/2008 Davison ............... H02H 1/046
335/18
2011/0121664 A1* 5/2011 Voisine ..................... H02J 7/00
307/143

FOREIGN PATENT DOCUMENTS

WO WO-2007145498 A1 * 12/2007 ............. G01R 22/06

* cited by examiner

*Primary Examiner* — Hal Kaplan
*Assistant Examiner* — Thai H Tran
(74) *Attorney, Agent, or Firm* — Kilpatrick Townsend & Stockton LLP

(57) ABSTRACT

A method for generating charge for a service disconnect operation for an electric meter includes: charging a service disconnect capacitor for an electric meter to a voltage higher than a voltage provided by a power supply of the electric meter; monitoring the voltage on the service disconnect capacitor; receiving, by the electric meter, a service disconnect switch instruction signal; determining, based on the monitoring, whether the voltage on the service disconnect capacitor exceeds a specified voltage threshold value; and in response to receiving the service disconnect switch instruction signal and determining that the voltage on the service disconnect capacitor exceeds the specified voltage threshold value, discharging the service disconnect capacitor through windings of a service disconnect actuator. The service disconnect actuator may be configured to cause contacts of a service disconnect switch to change position to make or break a circuit connection between a line voltage and a load.

18 Claims, 7 Drawing Sheets

GENERATING CHARGE FOR SERVICE DISCONNECT OPERATION

BACKGROUND

Unless otherwise indicated herein, the materials described in this section are not prior art to the claims in this application and are not admitted to be prior art by inclusion in this section.

An electric meter measures electrical power consumed by a customer of an electric utility provider. The electric meter is plugged into a meter socket that is mounted in an enclosure on a pole, a building, or other structure. The electric meter can include a service disconnect switch that can be operated to make or break a connection between the electrical power supplied by the electric power grid and the load (e.g., the customer premises).

In some cases, the service disconnect switch can be operated by a motor. Signals received by the motor from the electric meter circuitry can cause the contacts of the service disconnect switch to be closed, thereby making a connection between the power grid and the customer premises, or opened, thereby breaking the connection between the power grid and the customer premises. Operation of the motor typically requires high electrical current which is supplied by a power supply included in the electric meter.

SUMMARY

Systems and methods for providing electrical charge for operation of a service disconnect switch may be provided.

According to various aspects of the present disclosure there is provided a method for generating charge for a service disconnect operation for an electric meter. In some aspects, the method may include: charging a service disconnect capacitor for an electric meter to a voltage higher than a voltage provided by a power supply of the electric meter; monitoring the voltage on the service disconnect capacitor; receiving, by the electric meter, a service disconnect switch instruction signal; determining, based on the monitoring, whether the voltage on the service disconnect capacitor exceeds a specified voltage threshold value; and in response to receiving the service disconnect switch instruction signal and determining that the voltage on the service disconnect capacitor exceeds the specified voltage threshold value, discharging the service disconnect capacitor through windings of a service disconnect actuator. The service disconnect actuator may cause contacts of a service disconnect switch to change position to make or break a circuit connection between a line voltage and a load.

The service disconnect switch instruction signal may be received from a head-end system or may be a manually generated signal at the electric meter. Discharging the service disconnect capacitor may provide start-up current and operating current for the service disconnect actuator, or may provide only the start-up current for the service disconnect actuator. Operating current for the service disconnect actuator may be provided by the power supply of the electric meter. The service disconnect capacitor may be charged to a higher voltage than the voltage supplied by the power supply with a voltage doubling circuit.

The may further include delaying a start of charging the service disconnect capacitor until the service disconnect switch instruction signal is received. The service disconnect switch instruction signal may activate a peak detection circuit, and the peak detection circuit may cause a delay in activating the voltage doubling circuit until a peak voltage is detected. The peak detection circuit may be activated by a clock signal generated when the service disconnect switch instruction signal is received.

According to various aspects of the present disclosure there is provided an electric meter. In some aspects, the electric meter may include a service disconnect switch operable to make or break a circuit connection; a service disconnect actuator configured to change a position of a set of contacts of the service disconnect switch; a service disconnect capacitor configured to supply a start-up current to the service disconnect actuator; a power supply configured to provide a voltage to the electric meter; a charging circuit configured to increase the voltage provided by the power supply; and a processor configured to provide overall control of the electric meter.

The processor may be further configured to: cause the charging circuit to charge the service disconnect capacitor to a voltage higher than a voltage supplied by the power supply; monitor the voltage on the service disconnect capacitor; receive a service disconnect switch instruction signal; determine, based on monitoring the voltage, that the voltage on the service disconnect capacitor exceeds a specified voltage threshold value; and in response to receiving the service disconnect switch signal and determining that the voltage on the service disconnect capacitor exceeds the specified voltage threshold value, discharge the service disconnect capacitor through windings of the service disconnect actuator. The service disconnect actuator may be configured to cause contacts of the service disconnect switch to change position to make or break the circuit connection between a line voltage and a load.

The service disconnect switch instruction signal may be received via a communications module from a head-end system or may be manually generated by a manual switch at the electric meter. Discharging the service disconnect capacitor may provide start-up current and operating current for the service disconnect actuator, or may provide only the start-up current for the service disconnect actuator. Operating current for the service disconnect actuator may be provided by the power supply of the electric meter. The service disconnect capacitor may be charged to a voltage approximately twice the voltage provided by the power supply with a voltage doubling circuit. The processor may be further configured to delay a start of charging the service disconnect capacitor until the service disconnect switch instruction signal is received.

The electric meter may further include a peak detection circuit. The peak detection circuit may be configured to be activated by the service disconnect switch instruction signal, and may be configured to cause a delay in activating the voltage doubling circuit until a peak voltage is detected. The peak detection circuit may be configured to be activated by a clock signal generated when the service disconnect switch instruction signal is received.

According to various aspects of the present disclosure there is provided a system. In some aspects, the system may include: a head-end system including a server; and an electric meter in communication with the head-end system. The electric meter may include: a service disconnect switch operable to make or break a circuit connection; a service disconnect actuator configured to change a position of a set of contacts of the service disconnect switch; a service disconnect capacitor configured to supply a start-up current to the service disconnect actuator; a power supply configured to provide a voltage to the electric meter; a charging circuit configured to increase the voltage provided by the power supply; and a processor configured to provide overall control of the electric meter.

The processor may be further configured to: cause the charging circuit to charge the service disconnect capacitor to a voltage higher than a voltage supplied by the power supply; monitor the voltage on the service disconnect capacitor; receive a service disconnect switch instruction signal from the head-end system; determine, based on monitoring the voltage, that the voltage on the service disconnect capacitor exceeds a specified voltage threshold value; and in response to receiving the service disconnect switch signal and determining that the voltage on the service disconnect capacitor exceeds the specified voltage threshold value, discharge the service disconnect capacitor through windings of a service disconnect actuator. The service disconnect actuator may be configured to cause contacts of a service disconnect switch to change position to make or break the circuit connection between a line voltage and a load. Discharging the service disconnect capacitor may provide start-up current for the service disconnect actuator, and operating current for the service disconnect actuator may be provided by the power supply

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

An electric meter measures electrical power consumed by a customer of an electric utility provider. The electric meter may be located between the electrical wiring from the electric power grid of the electrical utility provider and the electrical wiring connecting to the customer premises. The electric meter may include a service disconnect switch that can be operated by a actuator, referred to herein as a service disconnect actuator, to make or break the connection between the electrical power supplied by the electric power grid and the load (e.g., the customer premises).

Figure 1:
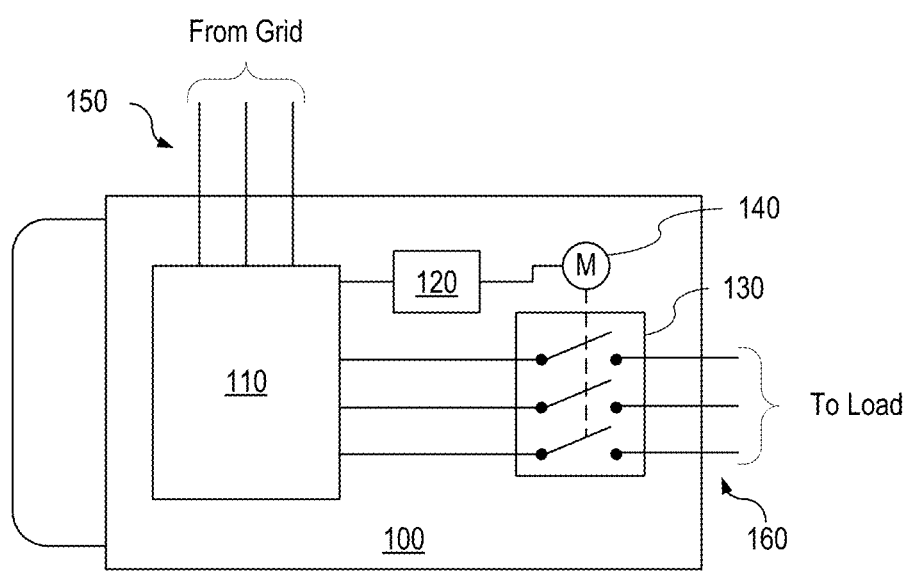
FIG. 1 is a simplified diagram illustrating an example of an electric meter according to some aspects of the present disclosure.

FIG. 1 is a simplified diagram illustrating an example of an electric meter 100 according to some aspects of the present disclosure. As illustrated in FIG. 1, the electric meter 100 may include measurement and control circuitry 110, a power supply 120, a service disconnect switch 130, and a service disconnect actuator 140. The measurement and control circuitry 110 may measure various parameters such as energy use, voltage, current, etc., of the power provided to the customer premises by the power lines 150 of the electric power grid. The service disconnect switch 130 may be provided to connect and disconnect the power lines 150 of the electric power grid to the customer premises wiring 160 (e.g., the load). The power supply 120 may provide the power to the service disconnect actuator 140 to open and close the service disconnect switch 130. The service disconnect actuator may be, for example, but not limited to, a motor, a relay, a solenoid, or other device configured to operate the service disconnect switch.

In order to connect or disconnect a customer premises from the electric power grid, the electric meter 100 may receive signals from a head-end system of the electrical utility provider to open or close the service disconnect switch 130. Upon receiving the signals from the head-end system, the measurement and control circuitry 110 of the electric meter 100 may generate signals to the service disconnect actuator 140. The signals received by the service disconnect actuator 140 from the measurement and control circuitry 110 can cause the contacts of the service disconnect switch 130 to be closed, thereby making a connection between the power grid and the customer premises, or opened, thereby breaking the connection between the power grid and the customer premises.

To ensure that the service disconnect actuator 140 fully opens or fully closes the contacts of the service disconnect switch 130, a high electrical current, for example, two amps or another high electrical current, may be supplied to the service disconnect actuator 140 by the power supply 120 and other circuitry of the electric meter 100. The high electrical current used to drive the service disconnect actuator 140 to fully open or fully close the contacts of the service disconnect switch 130 may be generated by a low voltage power supply and a storage capacitor, thereby eliminating a need for a dedicated higher voltage power supply to drive the service disconnect actuator 140.

According to some aspects of the present disclosure, systems and methods for generating charge for service disconnect operation may be provided. The charge may be generated by doubling the voltage provided on the power supply rail to obtain sufficient charge on the service disconnect capacitor to drive the service disconnect actuator. For example, with a power supply providing 12 volts on the power supply rail, the voltage may be doubled to charge the service disconnect capacitor to approximately 24 volts. The doubled voltage may enable the service disconnect capacitor to provide sufficient current to drive the service disconnect actuator.

To double the voltage, a processor may supply a clock signal, for example, a square wave pulse train to a voltage doubling circuit. The voltage doubling circuit may boost the charge on the service disconnect capacitor to generate a voltage of approximately twice the power supply voltage. The amount of boosted charge may be monitored as the voltage on the service disconnect capacitor. The voltage may be measured with an analog-to-digital converter (ADC) that provides a voltage value signal input to the processor. Based on the voltage value signal from the ADC, the processor may determine when the service disconnect capacitor has accumulated enough charge for operation of the service disconnect actuator and to stop the clock signal to the voltage doubling circuit.

Figure 2:
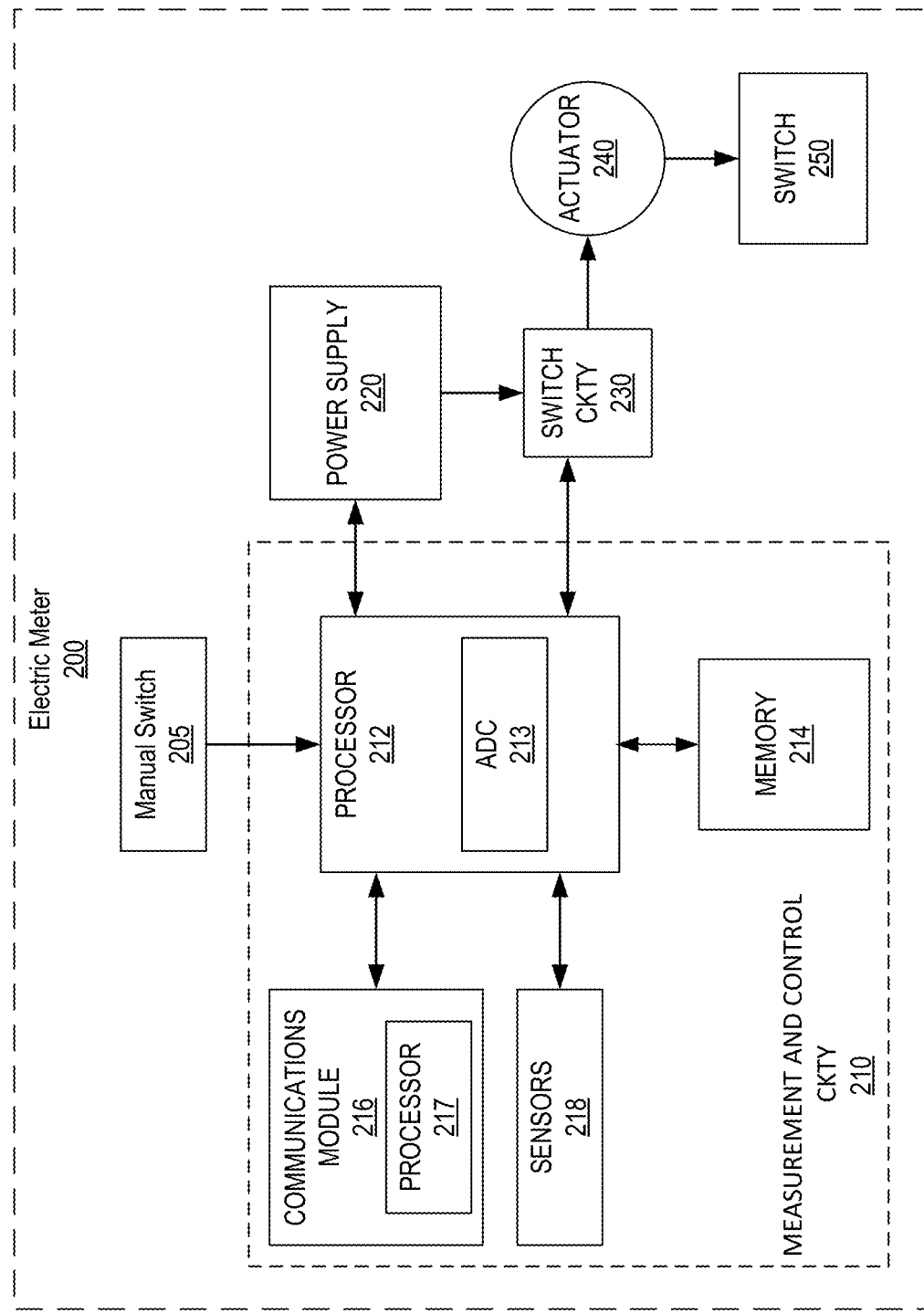
FIG. 2 is a block diagram illustrating an example of an electric meter according to some aspects of the present disclosure.

FIG. 2 is a block diagram illustrating an example of an electric meter 200 according to some aspects of the present disclosure. The electric meter 200 may be, for example, the electric meter 100 of FIG. 1. The electric meter 200 may include measurement and control circuitry 210, a manual switch 205, a power supply 220, switch circuitry 230, a service disconnect actuator 240, and a service disconnect switch 250.

The measurement and control circuitry 210 may be the measurement and control circuitry 110 of FIG. 1. The measurement and control circuitry 210 may include a processor 212, a memory 214, a communications module 216, and various sensors 218. The processor 212 may be a general purpose processor, a digital signal processor (DSP), an application specific integrated circuit (ASIC), a field programmable gate array (FPGA) or other programmable logic device. The processor 212 may be in electrical communication with the memory 214, the communications module 216, and the sensors 218. The processor 212 may include an analog-to-digital converter (ADC).

The processor 212 may control overall operation of the electric meter 200. The processor 212 may receive data generated by various sensors 218 of the electric meter 200 including, but not limited to, energy use, voltage, current, etc., and may perform operations on, or processing of, the data. The processor 212 may communicate with the communications module 216 to receive and transmit various operational parameters (e.g., energy usage), diagnostic data (e.g., error conditions), or other electric meter information (e.g., GPS coordinates) to a head-end system and/or to other electric meters via a wired or wireless network.

The memory 214 may be a storage device such as a solid state storage device or other storage device, and may be a combination of volatile and non-volatile storage or memory. In some implementations, portions of the memory may be included in the processor 212. The memory 214 may be configured to store instructions executable by the processor 212, as well as data generated by the various sensors 218 of the electric meter 200, and other applications executable by the processor 212.

The communications module 216 may be a wired or wireless transceiver operable to communicate via various wired or wireless protocols as known in the field for example, but not limited to the advanced metering infrastructure (AMI) protocols. The communications module 216 may include a communications processor 217. The communications module 216 may enable the electric meter 200 to communicate with other electric meters in a network (e.g., an AMI network) and with the utility provider (e.g., a head-end system) that controls the network. The communications module may be, for example, a radio frequency (RF) transceiver configured to wirelessly communicate with a head-end system and other electric meters and devices in a communications network. Many technologies are available for RF communications, for example, but not limited to, Cat-M, Cat-1, NB-IoT, ZigBee, Bluetooth, Wi-Fi, Wi-SUN, and cellular, as well as proprietary protocols, and the technologies may use many different frequencies.

The manual switch 205 may be a manually activated switch, for example, a momentary push-button switch, or another type of manually activated switch. The manual switch 205 may be operable to provide a signal to the processor 212 to initiate operation of the service disconnect actuator 240 to open or close the service disconnect switch 250.

The head-end system may be, for example, a server situated in an office location of a utility provider. The head-end system may communicate with the electric meters to collect meter identification information such as serial numbers, advanced metering infrastructure (AMI) identifiers, other utility-specific identifiers, as well as data generated by the electric meters such as global positioning system (GPS) coordinates, voltage and current data, accelerometer data, and notifications. The communications module 216 may transmit data and alarm signals to the utility provider and receive any of operational instructions, updated program instructions, firmware updates, updates to other settings, or other communications. The communications module 216 may receive service disconnect switch instruction signals 232 from the head-end system to open or close the service disconnect switch 250, and may communicate the service disconnect switch instruction signals to the processor 212.

The sensors 218 may include, but are not limited to, voltage sensors, current sensors, accelerometers, tilt switches, temperature sensors, and other sensors configured to monitor electrical and physical characteristics of the electric meter 200.

The power supply 220 may be the power supply 120 of FIG. 1. The power supply 220 may be a direct current (DC) power supply and may derive a primary alternating current (AC) voltage from the grid to which the electric meter 200 is connected. The power supply 220 may rectify the primary AC voltage to generate DC power at, for example, 12 volts or another DC voltage. The power supply 220 may supply DC power to the components of the electric meter 200.

The service disconnect switch 250 may be the service disconnect switch 130 in FIG. 1. The service disconnect switch 250 may include a set of contacts corresponding to the wires for the different electrical phase connections to the service disconnect switch 250. The service disconnect switch 250 may be operable to disconnect the line (e.g., the power grid) from the load (e.g., the customer premises wiring).

The service disconnect actuator 240 may be the service disconnect actuator 140 in FIG. 1. The service disconnect actuator 240 may be a DC motor, a relay, a solenoid, or other device configured to operate the service disconnect switch. In implementations for which a DC motor is used, the DC motor may be operable to rotate in a clockwise or counterclockwise direction based on the direction of current flow through the windings of the service disconnect motor 240 to open or close the switch contacts of the service disconnect switch 130. In other implementations, other actuators may be similarly operated.

The switch circuitry 230 may provide the voltage and current for operating the service disconnect actuator 240. The switch circuitry 230 may receive control signals from the processor 212 to open or close the switch contacts of the service disconnect switch 130.

Figure 3:
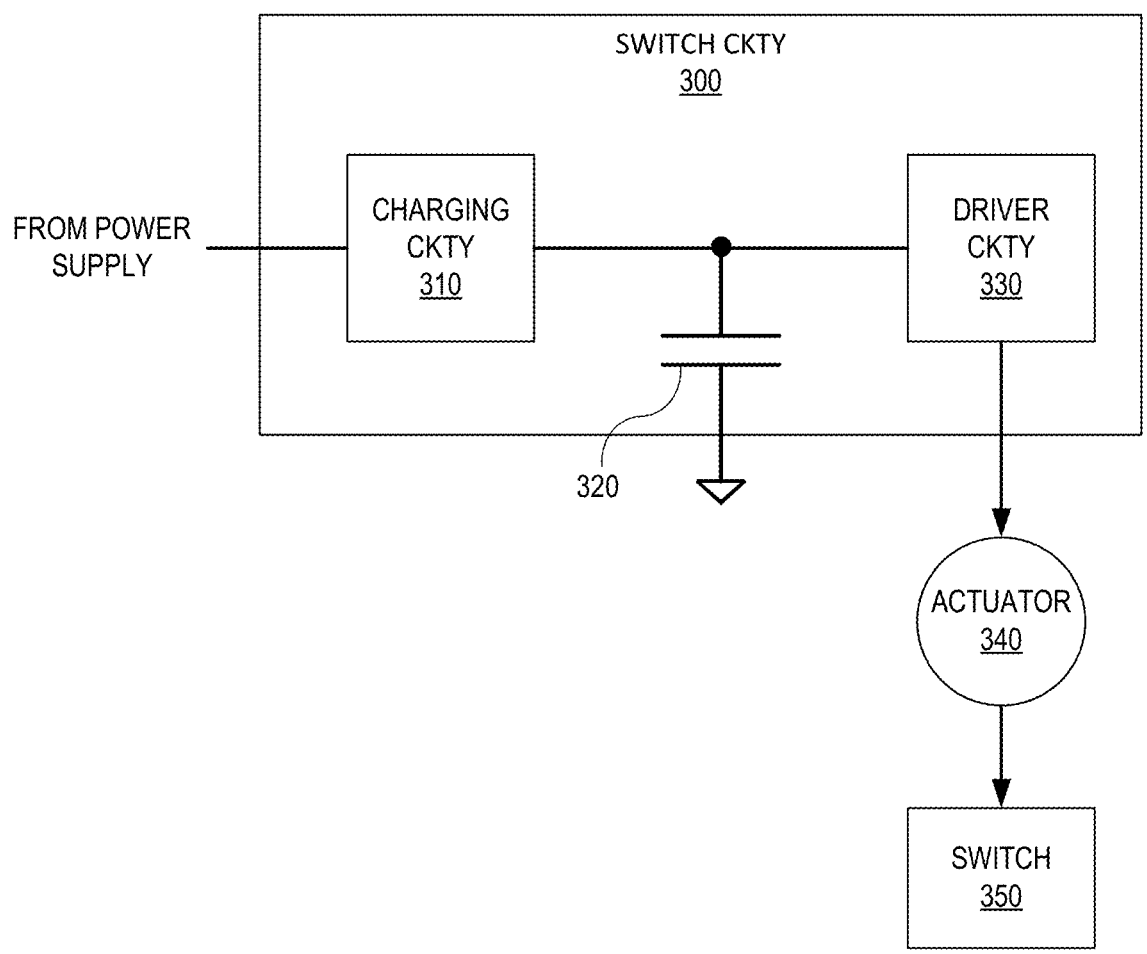
FIG. 3 is a simplified block diagram illustrating an example of the switch circuitry according to some aspects of the present disclosure.

FIG. 3 is a simplified block diagram illustrating an example of the switch circuitry 300 according to some aspects of the present disclosure. The service disconnect actuator may require a high electrical current, for example, two amps or another high electrical current to initially start operation. After start-up, a lower electrical current may maintain operation of the service disconnect actuator. Referring to FIG. 3, the switch circuitry 300 may include charging circuitry 310, a service disconnect capacitor 320, and driver circuitry 330. The charging circuitry 310 may increase a voltage input from the power supply (e.g., the power supply 220) and may charge the service disconnect capacitor 320 to the increased voltage. In some implementations, the charging circuitry 310 may double the voltage supplied by the power supply. For example, the power supply may supply 12 volts to the charging circuitry 310, and the charging circuitry 310 may generate 24 volts to charge the service disconnect capacitor 320. In some implementations, the service disconnect capacitor 320 may supply start-up current and operational current for the service disconnect actuator 340 to the driver circuitry 330.

In some implementations, the service disconnect capacitor 320 may supply start-up current for the service disconnect actuator 340 to the driver circuitry 330, and the power supply may supply operational current for the service disconnect actuator 340. After the service disconnect capacitor 320 provides the initial high start-up current for the service disconnect actuator 340, the voltage on the service disconnect capacitor 320 may drop to approximately the voltage provided by the power supply. At that point, the charging circuitry 310 may be disabled and operational current may be provided by the power supply and passed through components of the charging circuit to the service disconnect actuator 340.

The driver circuitry 330 may control the current flow through the windings of the service disconnect actuator 340 to cause the service disconnect actuator 340 to operate in a direction to open or close the switch contacts of the service disconnect switch 350. The driver circuitry 330 may receive control signals from the processor (e.g., the processor 212) to control the opening or closing of the switch contacts of the service disconnect switch 350.

Figure 4:
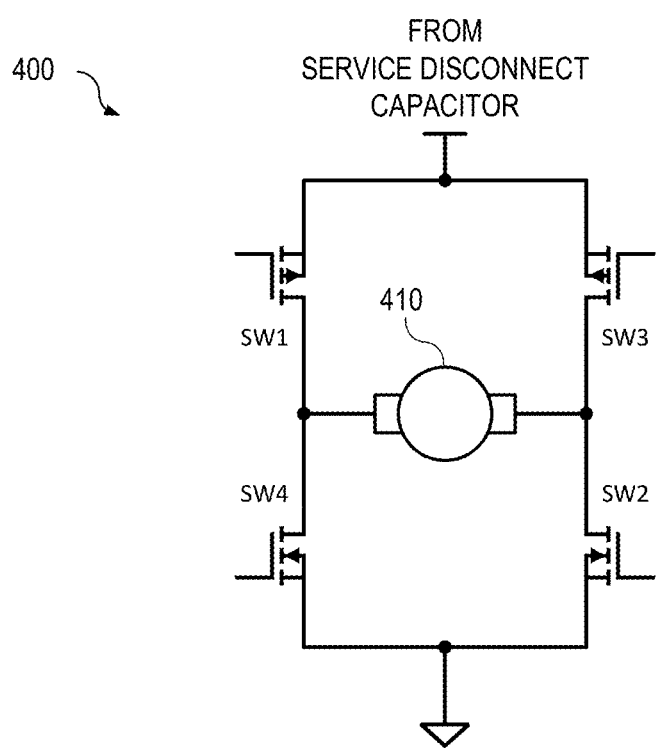
FIG. 4 is a simplified schematic diagram illustrating an example of driver circuitry according to some aspects of the present disclosure.

FIG. 4 is a simplified schematic diagram illustrating an example of driver circuitry 400 according to some aspects of the present disclosure. The driver circuitry 400 may be the driver circuitry 330 of FIG. 3. As illustrated in FIG. 4, the driver circuitry 400 may be an H-bridge circuit. The H-bridge circuit may include a set of switches SW1-SW4 operable to direct current flow through the windings of the service disconnect actuator 410. Current to operate the service disconnect actuator 410 may be supplied by the service disconnect capacitor (e.g., the service disconnect capacitor 320). An H-bridge may be constructed with four solid-state or mechanical switches. When the switches SW1 and SW2 in FIG. 4 are closed and switches SW3 and SW4 are open, a positive voltage may be applied across the service disconnect actuator 410. By opening switches SW1 and SW2 and closing switches SW3 and SW4, the voltage applied across the service disconnect actuator 410 may be reversed, allowing reverse operation of the service disconnect actuator 410.

The switches SW1-SW4 of the driver circuitry 400 may receive control signals from the processor (e.g., the processor 212) of the electric meter to activate the service disconnect actuator 410. The control signals may be generated by the processor based on service disconnect switch instruction signals received by the processor via the communications module (e.g., the communications module 216) from the head-end system. In some cases, the service disconnect switch instruction signals to the processor may be manually generated, for example, by a pushbutton (e.g., the manual switch 205) on the electric meter or by another method.

The control signals from the processor may be provided to the switches SW1-SW4 for a specified period of time. For example, switches SW1 and SW2 may receive control signals from the processor to turn the switches on while switches SW3 and SW4 remain in an off state. With switches SW1 and SW2 in the on state, current provided from the service disconnect capacitor can flow through the windings of the service disconnect actuator 410 in a first direction to cause the service disconnect motor 410 to operate in a first direction. In some cases, the processor may supply individual control signals to each of the switches SW1-SW4. In some cases, the processor may supply control signals to the pairs of switches SW1, SW2 and SW3, SW4

The service disconnect actuator 140, may require a high electrical current, for example, two amps or another high electrical current to initially start operation. After start-up, a lower electrical current may maintain operation of the service disconnect actuator 140. In some implementations, the service disconnect capacitor may supply start-up current for the service disconnect actuator 410 to the driver circuitry 400. In some implementations, the service disconnect capacitor may supply start-up current and operational current for the service disconnect actuator 410 to the driver circuitry 400.

A connection between the service disconnect actuator 410 and the service disconnect switch (e.g., the service disconnect switch 350) may cause the contacts of the service disconnect switch to close, thereby connecting the wiring from the line (e.g., the power grid) to the wiring for the load (e.g., the customer premises). The control signal from the processor may be provided to switches for a specified period of time sufficient for the service disconnect actuator 410 to move the contacts of the service disconnect switch to the closed position. The control signals may be provided multiple times, for example, two or more times, to ensure that the service disconnect actuator 410 causes the contacts to move fully to the closed position. The processor may provide sufficient time for the service disconnect capacitor to recharge, for example three seconds or another period of time, before subsequently providing the control signals to the switches.

Similarly, switches SW3 and SW4 may receive control signals from the processor to turn the switches on while switches SW1 and SW2 remain in an off state. With switches SW3 and SW4 in the on state, current provided from the service disconnect capacitor can flow through the windings of the service disconnect actuator 410 in a second direction to cause the service disconnect actuator 410 to operate in a second direction opposite to the first direction.

A connection between the service disconnect actuator 410 and the service disconnect switch (e.g., the service disconnect switch 350) may cause the contacts of the service disconnect switch to open, thereby disconnecting the wiring from the line (e.g., the power grid) from the wiring for the load (e.g., the customer premises). The control signal from the processor may be provided to the switches for a specified period of time sufficient for the service disconnect actuator 410 to move the contacts of the service disconnect switch to the open position. The control signals may be provided multiple times, for example, two or more times, to ensure that the service disconnect actuator 410 causes the contacts to move fully to the open position. The processor may provide sufficient time for the service disconnect capacitor to recharge, for example three seconds or another period of time, before subsequently providing the control signals to the switches.

After the service disconnect actuator 410 has caused the contacts of the service disconnect switch to open or close the connection between the line and load, the processor may provide control signals to turn the switches SW1-SW4 off, such that power may no longer be applied to the service disconnect actuator 410, and the contacts of the service disconnect switch may remain in the open or closed position. The directions of operation of the service disconnect actuator with respect to opening or closing of the contacts of the service disconnect switch are merely exemplary for purposes of explanation. While the switches SW1-SW4 are illustrated as metal oxide semiconductor field effect transistors (MOSFETs), other switches, for example bipolar transistors, relays, etc., may be used without departing from the scope of the present disclosure.

Figure 5:
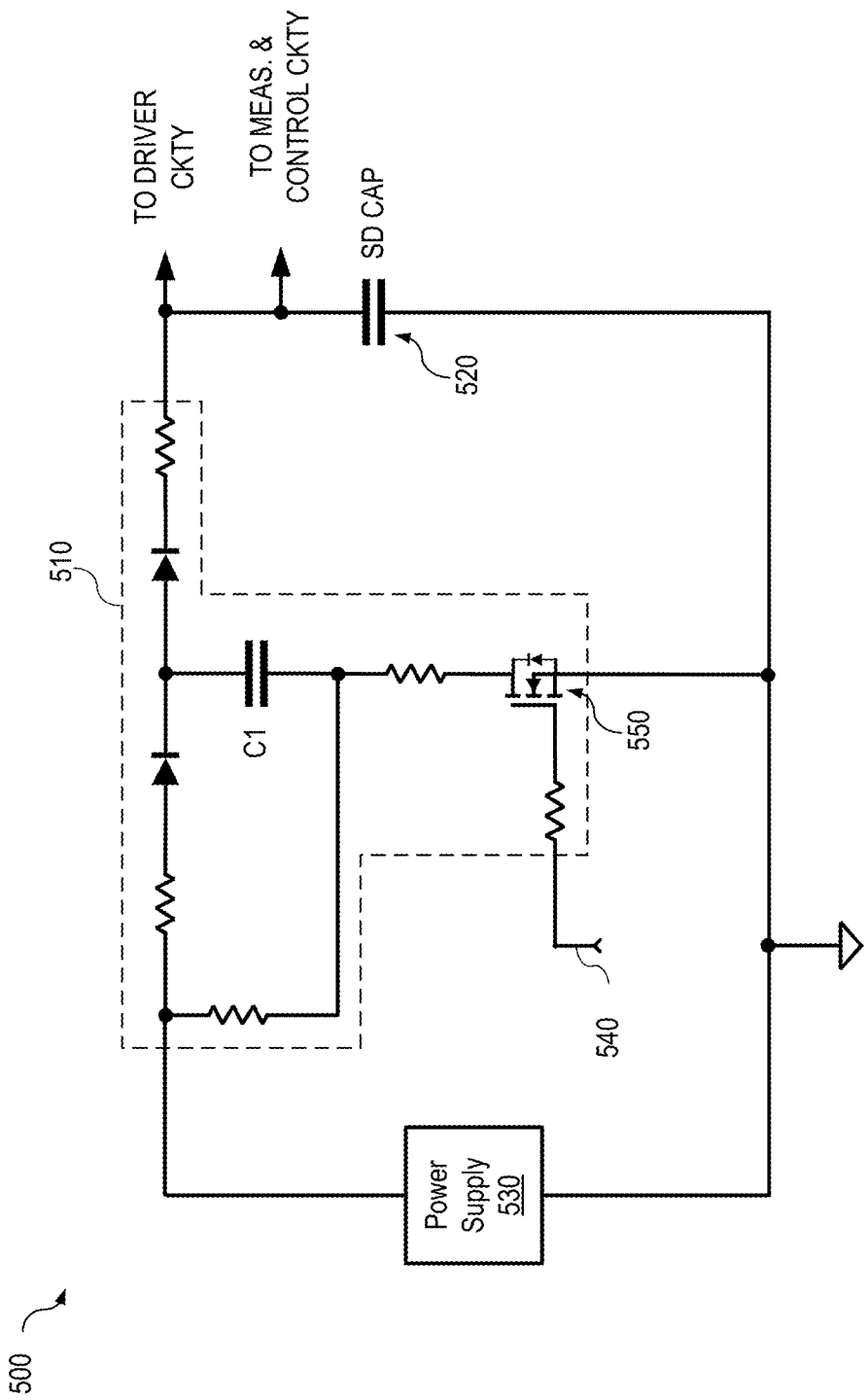
FIG. 5 is a simplified schematic diagram illustrating an example of a charging circuit according to some aspects of the present disclosure.

FIG. 5 is a simplified schematic diagram of illustrating an example of a charging circuit 500 according to some aspects of the present disclosure. The charging circuit 500 may include a voltage doubling circuit 510 operable to charge the service disconnect capacitor 520 to a voltage approximately twice the voltage provided by the power supply 530.

The measurement and control circuitry (e.g., the measurement and control circuitry 210) may monitor the voltage on the service disconnect capacitor 520 and may convert the voltage value to a digital value, for example, with the analog-to-digital converter (ADC) of the processor (e.g., the ADC 213 of the processor 212) or another ADC. The ADC may have sufficient resolution and sampling frequency to capture the service disconnect capacitor 520 measurements. The voltage measurements may be used by the processor to determine whether the service disconnect capacitor 520 is sufficiently charged to operate the service disconnect actuator (e.g., the service disconnect actuator 410), or whether the service disconnect capacitor 520 should be charged. When the monitored service disconnect capacitor voltage exceeds a specified threshold voltage value, for example, 20 volts or another voltage, the processor may determine that the service disconnect capacitor 520 is sufficiently charged to operate the service disconnect actuator.

When power is applied to the electric meter, such as when the meter is initially installed in a service panel, the processor may cause the service disconnect capacitor 520 to begin charging. Whenever the processor determines that the service disconnect capacitor 520 should be charged, the processor may provide a clock signal 540 to the voltage doubling circuit 510. In some implementations, the processor may cause a component external to the processor to provide the clock signal. The clock signal may be, for example, a square wave pulse train having an approximately 50% duty cycle or another duty cycle. Other clock signals may be used. The clock signal 540 may cause the switch 550 to open and close according to the duty cycle of the clock signal 540. Each time the switch is closed, for example, when the clock signal is at a high value, the capacitor C1 may accumulate charge from the power supply 530. Each time the switch is open, for example, when the clock signal is a low value, the capacitor C1 may transfer the accumulated charge to the service disconnect capacitor 520. The processor may sense when the service disconnect capacitor 520 is charged to approximately twice the power supply voltage and may cause the clock signal 540 to be discontinued. The charging circuit 500 may charge the service disconnect capacitor 520 within a short period of time, for example, 2-3 seconds or another period of time. While the switch 550 is illustrated as a MOSFET in FIG. 5, other switching components may be used without departing from the scope of the present disclosure.

The processor may cause the clock signal 540 to be generated upon receipt of an instruction from the head-end system to change the position of the service disconnect switch (e.g., the service disconnect switch 350), for example, open the service disconnect switch if it is closed, or close the service disconnect switch if it is open. Upon receipt of the service disconnect switch instruction signal to change the position of the service disconnect switch, the processor may cause the clock signal 540 to be generated to charge the service disconnect capacitor 520.

When the processor senses that the service disconnect capacitor 520 has charged to approximately twice the voltage of the power supply 530, the processor may cause the clock signal 540 to be discontinued, and may provide signals to the driver circuitry (e.g., the driver circuitry 330) to cause the service disconnect capacitor 520 to be discharged through the service disconnect actuator (e.g., the service disconnect actuator 340), thereby changing the position of the service disconnect switch. For example, the processor may provide control signals to the appropriate switches SW1-SW4 of the driver circuitry to enable the current provided by discharging the service disconnect capacitor 520 to cause the service disconnect actuator to operate in the appropriate direction to open or close the service disconnect switch according to the service disconnect switch instruction signal received from the head-end system. In some implementations, the service disconnect switch instruction signal to change the position of the service disconnect switch may be provided manually, for example, by a button press on a button provided on the electric meter, or by another method, that causes a signal to be sent to the processor.

The service disconnect capacitor 520 may discharge through the service disconnect actuator within a short period of time. In order to ensure that the service disconnect switch has been moved fully to the instructed position, either fully opened or fully closed, the charge-discharge sequence for the service disconnect capacitor 520 may be repeated two or more times, with a period of time, for example, three seconds or another period of time, for the service disconnect capacitor 520 to charge between discharges.

Figure 6:
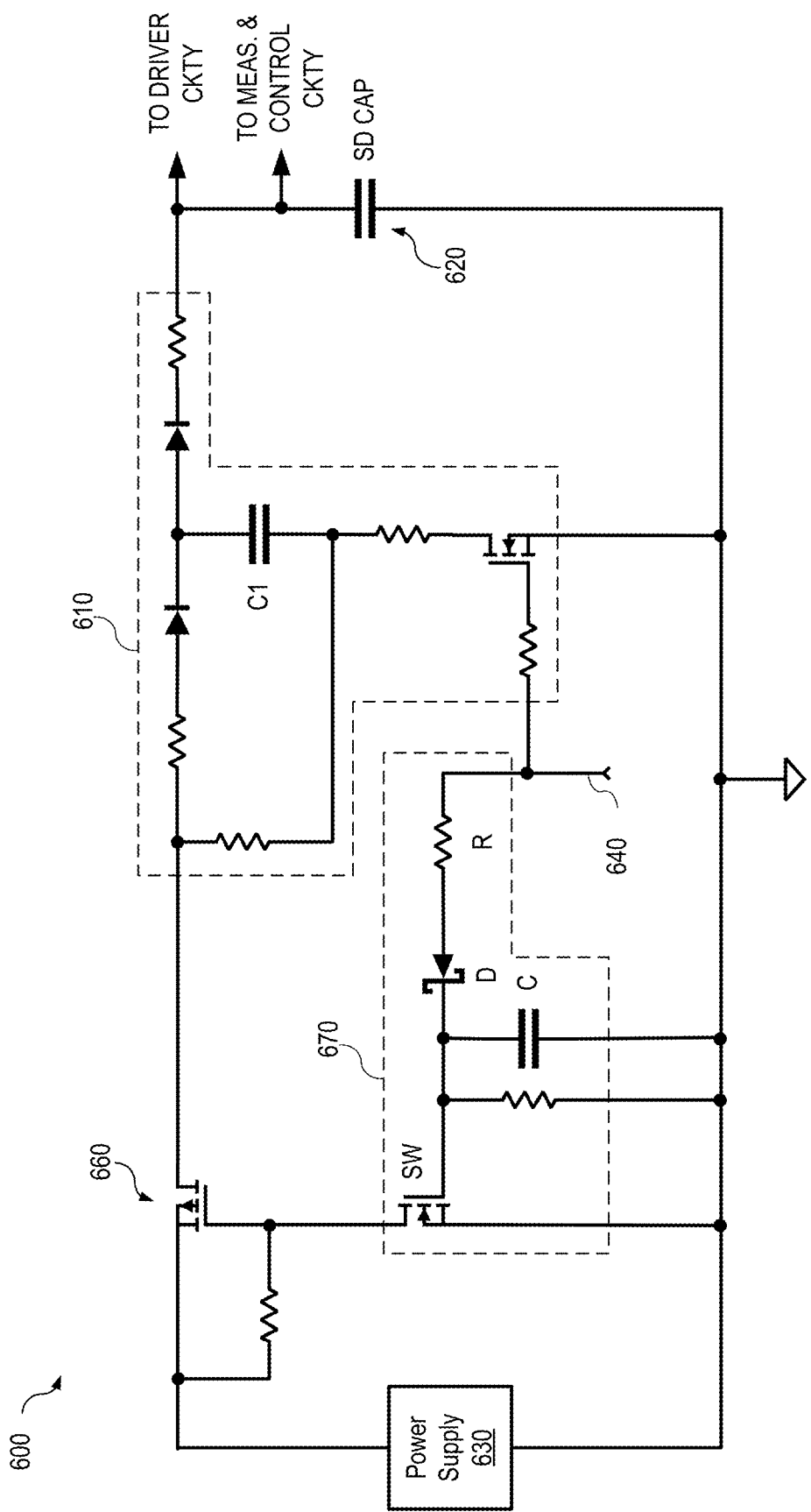
FIG. 6 is a simplified schematic diagram illustrating another example of a charging circuit according to some aspects of the present disclosure.

FIG. 6 is a simplified schematic diagram illustrating another example of a charging circuit 600 according to some aspects of the present disclosure. In the example of FIG. 6, the charging circuit 600 may include a voltage doubling circuit 610, a power switch 660, and a peak detection circuit 670. The voltage doubling circuit 610 may operate similarly to the voltage doubling circuit 510 in FIG. 5, and will not be further described here.

The power switch 660 and the peak detection circuit 670 may combine to prevent charging of the service disconnect capacitor 620 until the processor (e.g., the processor 212) determines that it should be charged. Whenever the processor determines that the service disconnect capacitor 620 should be charged, the processor may provide a clock signal 640 to the voltage doubling circuit 610. In some implementations, the processor may cause a component external to the processor to provide the clock signal.

The clock signal 640 may also be applied to the peak detection circuit 670. The clock signal 640 may cause the capacitor C of the peak detection circuit 670 to charge to a peak voltage value through the resistor R and the diode D, thereby creating a delay before the switch SW turns on. When the switch SW turns on, the power switch 660 also turns on and supplies the voltage from the power supply 630 to the voltage doubling circuit 610. Therefore, the delay provided by the peak detection circuit 670 delays the operation of the voltage doubling circuit 610 to charge the service disconnect capacitor 620. In some implementations, rather than using the peak detection circuit 670, the power switch 660 may be controlled by a separate signal from the processor.

The additional control provided by the peak detection circuit 670 or the additional processor signal can prevent the service disconnect capacitor 620 from being charged until instructed by the processor, and enables the load on the power supply 630 to be reduced, for example, during a power outage when the stored energy in the electric meter is needed to save data to memory. Further, since the service disconnect capacitor 620 is not charged until it is needed, inadvertent or incomplete operation of the service disconnect switch resulting from a component failure or an errant signal from the processor may be minimized.

In yet another example, the components for the power supply 630 and the voltage doubling circuit 610 may be selected such that they can handle the additional power required by the service disconnect actuator when in operation. Selecting the components in this manner may permit use of a reduced size (e.g., lower capacitance value, smaller physical size) service disconnect capacitor 620. In operation, the processor (e.g., the processor 212 may cause the service disconnect capacitor 620 to charge up to provide the starting current of the service disconnect actuator (e.g., the service disconnect actuator 240) by generating the clock signal 640 to the voltage doubling circuit 610. When the processor receives a service disconnect switch instruction signal (e.g., from the head-end system), the service disconnect capacitor 620 may begin to discharge as it supplies current to the service disconnect actuator. In some implementations, the processor may continue to supply the clock signal 640 to the voltage doubling circuit 610 until the service disconnect capacitor 620 is discharged to about the voltage level supplied by the power supply rail. At that point, the processor may discontinue supplying the clock signal 640 to the voltage doubling circuit 610 and the power supply may supply the operating voltage for the service disconnect actuator.

In some implementations, when the processor receives the service disconnect switch instruction signal, it may discontinue the clock signal 640 to the voltage doubling circuit 610. When the service disconnect capacitor 620 is discharged to about the voltage level of the power supply rail, the power supply 630 may supply the operating voltage for the service disconnect actuator. Selecting the power supply 630 and voltage doubling circuit 610 components to enable the power supply 630 to accommodate the load of the service disconnect actuator can allow a reduction in the service disconnect capacitor 620 size, thereby reducing the footprint and the cost of service disconnect capacitor 620. The service disconnect capacitor 620 can be selected to provide the starting current of the service disconnect actuator.

Figure 7:
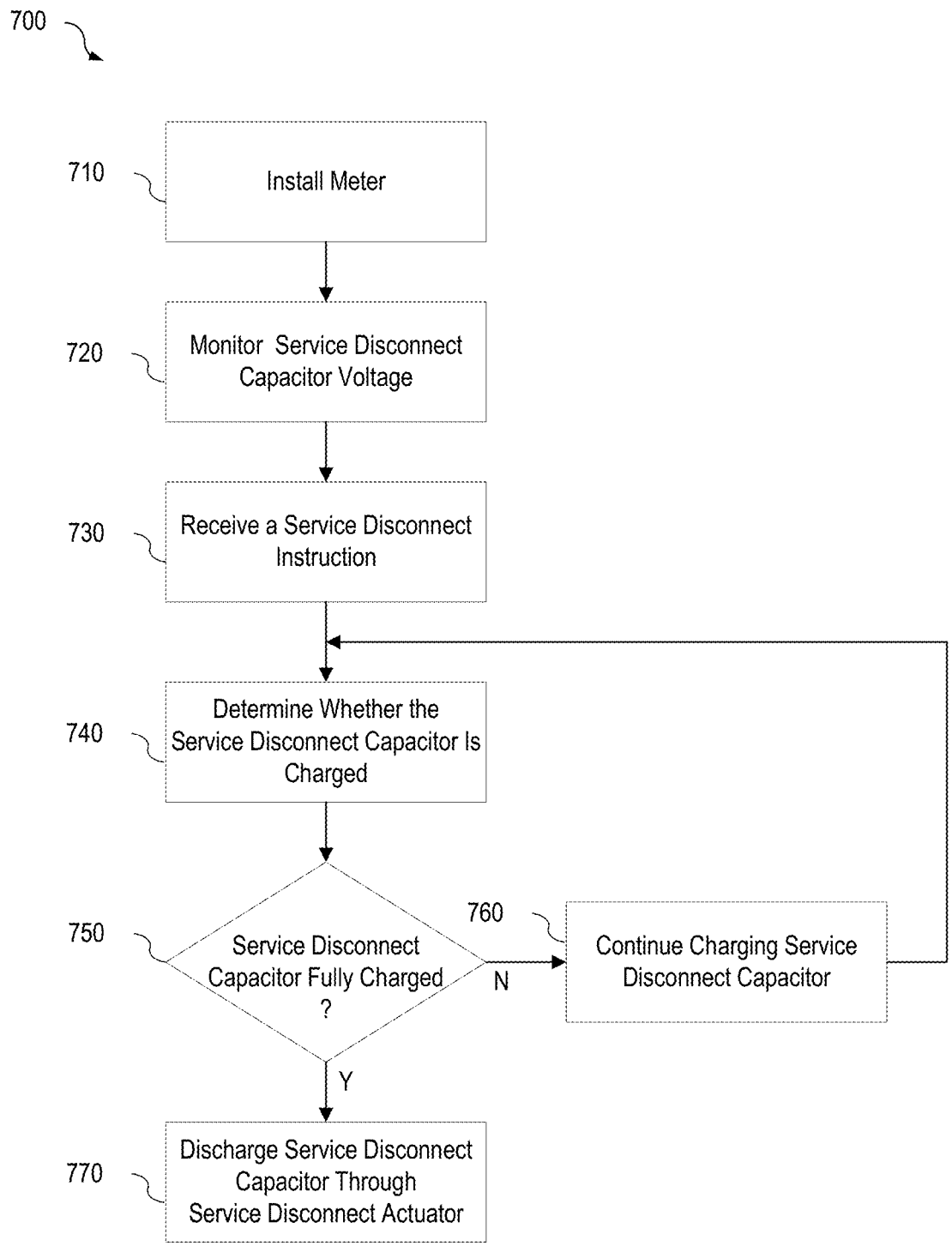
FIG. 7 is a flowchart illustrating an example of a method for generating charge for a service disconnect operation for an electric meter according to some aspects of the present disclosure.

FIG. 7 is a flowchart illustrating an example of a method 700 for generating charge for a service disconnect operation for an electric meter. Referring to FIG. 7, at block 710, an electric meter may be installed in a service panel at a customer premises. For example, the electric meter may be installed on a pole or on the wall of a building or other structure.

In some implementations, a charging circuit, for example, the charging circuit described with respect to FIG. 5, may begin charging the service disconnect capacitor when power is applied to the electric meter. In some implementations, a charging circuit, for example, the charging circuit described with respect to FIG. 6, may begin charging the service disconnect capacitor after a service disconnect switch instruction signal is received by the electric meter from the head-end system or from a manually provided signal, for example, a button press at the electric meter.

At block 720, the voltage on the service disconnect capacitor may be monitored. The voltage on the service disconnect capacitor may be may be sampled by the ADC (e.g., the ADC 213) of the processor (e.g., the processor 212) of the electric meter or by another ADC in the electric meter. The sampled voltage value may be provided to the processor by the ADC.

At block 730, a service disconnect switch instruction signal may be received. The service disconnect switch instruction signal may be received by the processor via the communications module (e.g., the communications module 216) from the head-end system. In some cases, the service disconnect switch instruction signal to the processor may be manually generated, for example, by a pushbutton on the electric meter or by another method.

At block 740, it may be determined whether the service disconnect capacitor is fully charged. Based on the monitoring of the service disconnect capacitor voltage, the processor may determine whether the voltage on the service disconnect capacitor exceeds a specified voltage threshold value, for example, 20 volts or another voltage value.

At block 750, in response to determining that the service disconnect capacitor is not charged (750-N), at block 760, the service disconnect capacitor may continue charging, and the method may continue at block 740. In some implementations, the service disconnect capacitor may begin charging when power is applied to the electric meter upon installation, and the service disconnect capacitor may be fully charged. In some implementations, the service disconnect capacitor may begin charging after the service disconnect switch instruction signal is received by the electric meter. For example, in some implementations, a peak detection circuit (e.g., the peak detection circuit 670) may delay charging of the service disconnect capacitor until the peak detection circuit is activated by a clock signal or another activation signal from the processor. The clock signal may be, for example, a square wave pulse train or another clock signal.

In response to determining that the service disconnect capacitor is charged (750-Y), at block 770, the service disconnect capacitor may be discharged through the windings of the service disconnect actuator (e.g., the service disconnect actuator 340). In some implementations, the service disconnect capacitor may supply start-up current for the service disconnect actuator to the driver circuitry (e.g., the driver circuitry 330). In some implementations, the service disconnect capacitor may supply start-up current and operational current for the service disconnect actuator to the driver circuitry.

The driver circuitry may control the current flow through the windings of the service disconnect actuator to cause the service disconnect actuator to operate in a direction to open or close the switch contacts of the service disconnect switch (e.g., the service disconnect switch 350). The driver circuitry may receive control signals from the processor to control the opening or closing of the switch contacts of the service disconnect switch. The service disconnect actuator may cause contacts of the service disconnect switch to change position to make or break a circuit connection between a line voltage (e.g., wiring from the electric power grid) and a load (e.g., the customer premises).

The specific steps illustrated in FIG. 7 provide a particular method for generating charge for a service disconnect operation for an electric meter according to an embodiment of the present disclosure. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications.

The examples and embodiments described herein are for illustrative purposes only. Various modifications or changes in light thereof will be apparent to persons skilled in the art. For example, different types of sensors other than an accelerometer may be used to determine changes in orientation of the electric meter. These are to be included within the spirit and purview of this application, and the scope of the appended claims, which follow.

What is claimed is:

1. A method for generating charge for a service disconnect operation for an electric meter, the method comprising:
  charging a service disconnect capacitor for the electric meter to a voltage higher than a voltage provided by a power supply of the electric meter;
  monitoring the voltage on the service disconnect capacitor;
  receiving, by the electric meter, a service disconnect switch instruction signal;
  determining, based on the monitoring, whether the voltage on the service disconnect capacitor exceeds a specified voltage threshold value; and
  in response to receiving the service disconnect switch instruction signal and determining that the voltage on the service disconnect capacitor exceeds the specified voltage threshold value, discharging the service disconnect capacitor through windings of a service disconnect actuator,
  wherein the service disconnect actuator is configured to cause contacts of a service disconnect switch to change position to make or break a circuit connection between a line voltage and a load,
  wherein the service disconnect switch instruction signal initiates a clock signal to a peak detection circuit,
  wherein the clock signal operates to charge a capacitor in the peak detection circuit, and
  wherein charging of the service disconnect capacitor is delayed until a peak voltage on the capacitor in the peak detection circuit is detected.

2. The method of claim 1, wherein the service disconnect switch instruction signal is received from a head-end system.

3. The method of claim 1, wherein the service disconnect switch instruction signal is a manually generated signal at the electric meter.

4. The method of claim 1, wherein discharging the service disconnect capacitor provides start-up current and operating current for the service disconnect actuator.

5. The method of claim 1, wherein:
  discharging the service disconnect capacitor provides start-up current for the service disconnect actuator, and
  operating current for the service disconnect actuator is provided by the power supply of the electric meter.

6. The method of claim 1, wherein the service disconnect capacitor is charged to a higher voltage than the voltage supplied by the power supply with a voltage doubling circuit.

7. The method of claim 1,
  wherein the peak detection circuit causes a delay in activating a voltage doubling circuit configured to charge the service disconnect capacitor until the peak voltage of the clock signal is detected.

8. The method of claim 7, wherein the peak detection circuit is activated by the clock signal generated when the service disconnect switch instruction signal is received.

9. An electric meter, comprising:
  a service disconnect switch operable to make or break a circuit connection;
  a service disconnect actuator configured to change a position of a set of contacts of the service disconnect switch;
  a service disconnect capacitor configured to supply a start-up current to the service disconnect actuator;
  a power supply configured to provide a voltage to the electric meter;
  a charging circuit configured to increase the voltage provided by the power supply; and
  a processor configured to provide overall control of the electric meter, the processor further configured to:
    cause the charging circuit to charge the service disconnect capacitor to a voltage higher than a voltage supplied by the power supply;
    monitor the voltage on the service disconnect capacitor;
    receive a service disconnect switch instruction signal;
    determine, based on monitoring the voltage, that the voltage on the service disconnect capacitor exceeds a specified voltage threshold value; and
    in response to receiving the service disconnect switch instruction signal and determining that the voltage on the service disconnect capacitor exceeds the specified voltage threshold value, discharge the service disconnect capacitor through windings of the service disconnect actuator,
  wherein the service disconnect actuator is configured to cause contacts of the service disconnect switch to change position to make or break the circuit connection between a line voltage and a load,
  wherein the service disconnect switch instruction signal initiates a clock signal to a peak detection circuit,
  wherein the clock signal operates to charge a capacitor in the peak detection circuit, and
  wherein charging of the service disconnect capacitor is delayed until a peak voltage on the capacitor in the peak detection circuit is detected.

10. The electric meter of claim 9, further comprising a communications module,
  wherein the communications module is configured to receive the service disconnect switch instruction signal from a head-end system.

11. The electric meter of claim 9, further comprising a manual switch,
  wherein the manual switch is operable to generate the service disconnect switch instruction signal at the electric meter.

12. The electric meter of claim 9, wherein discharging the service disconnect capacitor provides start-up current and operating current for the service disconnect actuator.

13. The electric meter of claim 9, wherein:
  discharging the service disconnect capacitor provides start-up current for the service disconnect actuator, and
  operating current for the service disconnect actuator is provided by the power supply.

14. The electric meter of claim 9, wherein:
  the charging circuit comprises a voltage doubling circuit, and the voltage doubling circuit is configured to charge the service disconnect capacitor to a voltage approximately twice the voltage provided by the power supply.

15. The electric meter of claim 9,
wherein the peak detection circuit is configured to cause a delay in activating a voltage doubling circuit configured to charge the service disconnect capacitor until the peak voltage of the clock signal is detected.

16. The electric meter of claim 15, wherein the peak detection circuit is configured to be activated by the clock signal generated when the service disconnect switch instruction signal is received.

17. A system comprising:
a head-end system including a server; and
an electric meter in communication with the head-end system, the electric meter comprising:
a service disconnect switch operable to make or break a circuit connection;
a service disconnect actuator configured to change a position of a set of contacts of the service disconnect switch;
a service disconnect capacitor configured to supply a start-up current to the service disconnect actuator;
a power supply configured to provide a voltage to the electric meter;
a charging circuit configured to increase the voltage provided by the power supply; and
a processor configured to provide overall control of the electric meter, the processor further configured to:
cause the charging circuit to charge the service disconnect capacitor to a voltage higher than a voltage supplied by the power supply;
monitor the voltage on the service disconnect capacitor;
receive a service disconnect switch instruction signal from the head-end system;
determine, based on monitoring the voltage, that the voltage on the service disconnect capacitor exceeds a specified voltage threshold value; and
in response to receiving the service disconnect switch instruction signal and determining that the voltage on the service disconnect capacitor exceeds the specified voltage threshold value, discharge the service disconnect capacitor through windings of the service disconnect actuator,
wherein the service disconnect actuator is configured to cause contacts of the service disconnect switch to change position to make or break the circuit connection between a line voltage and a load,
wherein the service disconnect switch instruction signal initiates a clock signal to a peak detection circuit,
wherein the clock signal operates to charge a capacitor in the peak detection circuit, and
wherein charging of the service disconnect capacitor is delayed until a peak voltage on the capacitor in the peak detection circuit is detected.

18. The system of claim 17, wherein:
discharging the service disconnect capacitor provides start-up current for the service disconnect actuator, and
operating current for the service disconnect actuator is provided by the power supply.

* * * * *